US012666299B2

(12) United States Patent
Hashmi et al.

(10) Patent No.: US 12,666,299 B2
(45) Date of Patent: Jun. 23, 2026

(54) FACILITATING CONCURRENT ENERGY AWARE ADMISSION CONTROL, DYNAMIC LOAD BALANCING, AND TRAFFIC STEERING IN ADVANCED COMMUNICATION NETWORKS

(71) Applicant: Dell Products, L.P., Round Rock, TX (US)

(72) Inventors: Umair Sajid Hashmi, Mississauga (CA); Jeebak Mitra, Ottawa (CA); Gwenael Poitau, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 301 days.

(21) Appl. No.: 18/604,197

(22) Filed: Mar. 13, 2024

(65) Prior Publication Data

US 2025/0294402 A1      Sep. 18, 2025

(51) Int. Cl.
| | |
|---|---|
| *H04W 28/08* | (2023.01) |
| *H04W 28/02* | (2009.01) |
| *H04W 48/06* | (2009.01) |

(52) U.S. Cl.
CPC ... *H04W 28/0221* (2013.01); *H04W 28/0925* (2020.05); *H04W 48/06* (2013.01)

(58) Field of Classification Search
None
See application file for complete search history.

(56) References Cited

U.S. PATENT DOCUMENTS

| | | | | |
|---|---|---|---|---|
| 2022/0264371 A1* | 8/2022 | Strasman | ................ | H04L 47/28 |
| 2024/0215081 A1* | 6/2024 | Dogra | ................ | H04W 12/088 |
| 2025/0097146 A1* | 3/2025 | Colom Ikuno | ....... | H04L 45/306 |

OTHER PUBLICATIONS

NGMN Alliance, "Network Energy Efficiency", Green Future Networks ver 1.1, Dec. 2021 (56 pages).
3GPP TSG-SA5 Meeting #138-e, Nokia, Nokia Shanghai Bell, Combination of Key issues, e-meeting, Aug. 23-31, 2021.
D'Oro et al., "dApps: Distributed Applications for Real-time Inference and Control in O-RAN," in IEEE Communications Magazine, doi: 10.1109/MCOM.002.2200079. Aug. 18, 2022 (7 pages).

* cited by examiner

*Primary Examiner* — Robert M Morlan
(74) *Attorney, Agent, or Firm* — Amin, Turocy & Watson, LLP

(57)      ABSTRACT

Facilitating concurrent energy aware admission control, dynamic load balancing, and traffic steering in advanced communication networks is provided. A method includes facilitating energy efficiency aware load balancing of already served user equipment to distribute the already served user equipment among a group of cells of a communication network. The method also includes facilitating controlling of admission of incoming user equipment to the communication network and facilitating traffic steering of the incoming user equipment among the group of cells. Further, the method includes facilitating conflict mitigation among respective policies associated with facilitating the energy efficiency aware load balancing, facilitating of the controlling of the admission, and facilitating of the traffic steering. Facilitating of the energy efficiency aware load balancing, facilitating of the controlling of the admission, facilitating of the traffic steering, and facilitating of the conflict mitigation are performed concurrently and are based on a utility function.

20 Claims, 9 Drawing Sheets

$$\min \sum_{t=0}^{t=T-1} \left( P \sum_c \frac{\rho_c}{\sigma_c} \right)^\alpha \left( \left( \frac{\rho_c}{\sigma_c} \right)_t \right)^\beta \left( \sum_c \frac{N^{UE}_{non-violate,c}}{N^{UE}_{Totals}} \right)^\beta_t \left( \frac{P_{cluster}}{P_{max}} \right)^\gamma_t ; \forall c \in C, cell \in CELL \quad (1)$$

FIG. 2A

$$\left( \frac{\rho_c}{\sigma_c} \right)_t$$

FIG. 2B

$$\left( \sum_c \frac{N^{UE}_{non-violate,c}}{N^{UE}_{Totals}} \right)_t$$

FIG. 2C

$$\left( \frac{P_{cluster}}{P_{max}} \right)_t$$

FIG. 2D

$$PRButil_{cell} < PRButil_{thresh};$$
$$\alpha, \beta, \gamma \geq 0;$$
$$\alpha + \beta + \gamma = 1.$$

FIG. 3

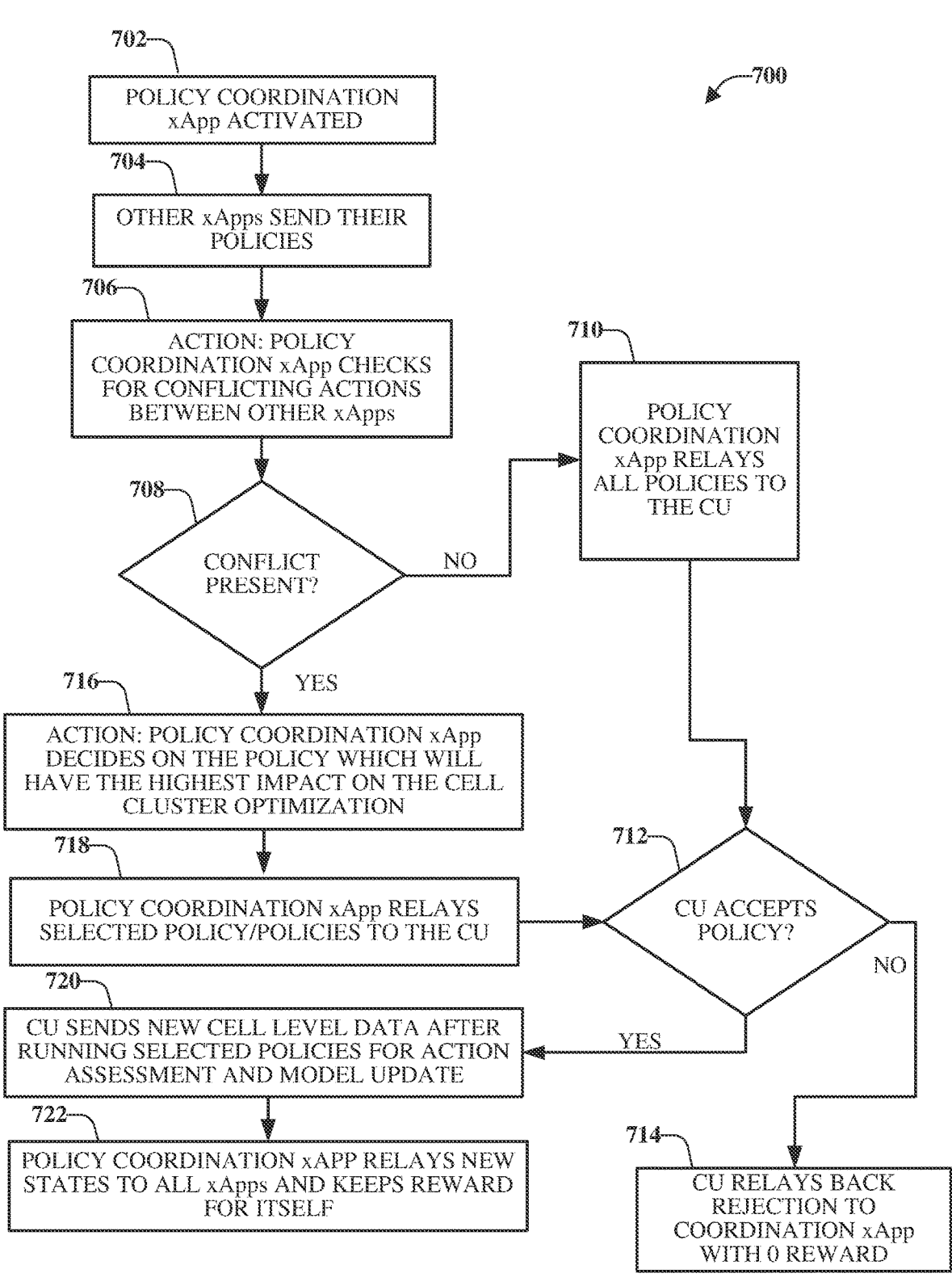

702— POLICY COORDINATION xApp ACTIVATED

704— OTHER xApps SEND THEIR POLICIES

706— ACTION: POLICY COORDINATION xApp CHECKS FOR CONFLICTING ACTIONS BETWEEN OTHER xApps

700

708— CONFLICT PRESENT?

NO

710— POLICY COORDINATION xApp RELAYS ALL POLICIES TO THE CU

YES

716— ACTION: POLICY COORDINATION xApp DECIDES ON THE POLICY WHICH WILL HAVE THE HIGHEST IMPACT ON THE CELL CLUSTER OPTIMIZATION

718— POLICY COORDINATION xApp RELAYS SELECTED POLICY/POLICIES TO THE CU

712— CU ACCEPTS POLICY?

NO

720— CU SENDS NEW CELL LEVEL DATA AFTER RUNNING SELECTED POLICIES FOR ACTION ASSESSMENT AND MODEL UPDATE

YES

722— POLICY COORDINATION xAPP RELAYS NEW STATES TO ALL xApps AND KEEPS REWARD FOR ITSELF 714— CU RELAYS BACK REJECTION TO COORDINATION xApp WITH 0 REWARD

FIG. 7

$$R^t = \begin{cases} 1 - e^{Z(u^t-1)}, \text{ for valid action} & ; Z > 1, Z \in [-1, 0] \\ Z, \text{ for invalid action} \end{cases} \quad (2)$$

FIG. 8

FACILITATING CONCURRENT ENERGY AWARE ADMISSION CONTROL, DYNAMIC LOAD BALANCING, AND TRAFFIC STEERING IN ADVANCED COMMUNICATION NETWORKS

BACKGROUND

The use of computing devices is ubiquitous. Given the explosive demand placed upon mobility networks and the advent of advanced use cases (e.g., streaming, gaming, and so on), power consumption in such networks is higher as compared to Long Term Evolution (LTE) networks, for example. Such power consumption can be attributed to the exponential increase in the network traffic flowing through the advanced network and the need for faster processing of complex tasks. Accordingly, unique challenges exist related to network efficiency and in view of forthcoming Fifth Generation (5G), new radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An embodiment relates to a method that includes facilitating, by a system comprising at least one processor, energy efficiency aware load balancing of already served user equipment. The energy efficiency aware load balancing distributes the already served user equipment among a group of cells of a communication network. The method also includes facilitating, by the system, controlling of admission of incoming user equipment to the communication network. Further, the method includes facilitating, by the system, traffic steering of the incoming user equipment among the group of cells. The method also includes facilitating, by the system, conflict mitigation among respective policies associated with the facilitating the energy efficiency aware load balancing, the facilitating of the controlling of the admission, and the facilitating of the traffic steering. Based on a determination that a conflict exists among the respective policies, the conflict mitigation selects a policy from the respective polices for implementation. The facilitating of the energy efficiency aware load balancing, the facilitating of the controlling of the admission, the facilitating of the traffic steering, and the facilitating of the conflict mitigation are performed concurrently and are based on a utility function.

According to an implementation, facilitating of the energy efficiency aware load balancing is based on a load balancing policy determined by a load balancing model. Further to this implementation the method can include, based on receipt of a first acceptance of the load balancing policy from a coordination application and a second acceptance of the load balancing policy from a control unit: initiating, by the system, a handover of selected user equipment of the already served user equipment to cells of the group of cells determined to have a higher utility gain potential as compared to other cells of the group of cells. The method can also include, after completion of the handover, sending, by the system, updated cell level data to the load balancing model. The load balancing model is retrained on the updated cell level data. The method can also include applying, by the system, a reward to the load balancing model based on a reward function.

In accordance with some implementations, facilitating of the controlling of the admission is based on an admission control policy determined by an admission control model. Further to these implementations, the method can include, based on receipt of a first acceptance of the admission control policy from a coordination application and a second acceptance of the admission control policy from a control unit, and based on the incoming user equipment being admitted to a defined radio unit: sending, by the system, an admission approval message to the incoming user equipment. The method can also include, after completion of establishment of the incoming user equipment within a selected cell, sending, by the system, updated cell level data to the admission control model. The admission control model is retrained on the updated cell level data. Further, the method can include applying, by the system, a reward to the admission control model based on a reward function.

In some implementations, facilitating of the energy efficiency aware load balancing is based on a first policy, facilitating the controlling of the admission is based on a second policy, and facilitating the traffic steering is based on a third policy. According to these implementations the facilitating of the conflict mitigation can include determining a conflict exists between the first policy and the second policy. Based on the utility function, the method can include determining that the first policy comprises a first utility gain and the second policy comprises a second utility gain, wherein the second utility gain is more than the first utility gain. Further, the method can include implementing the second policy, wherein the first policy is not implemented.

Facilitating of the traffic steering can include, according to some implementations, based on a cell deactivation policy, switching off a cell determined to have a network load that is below a defined network load level. The switching off of the cell can mitigate an overall power consumption of the group of cells.

In some implementations, facilitating of the energy efficiency aware load balancing can include, based on a load balancing policy, determining that one or more user equipment of the already served user equipment are to be offloaded from a current serving cell to a single candidate cell. Further, based on the utility function, the method can include selecting the one or more user equipment of the already served user equipment. The method can also include causing the one or more user equipment to be handed off from the current serving cell to the single candidate cell.

According to some implementations, facilitating of the controlling of the admission can include, based on receipt of an admission request from an incoming user equipment and based on an admission control policy, selecting a cell from the group of cells for admission of the incoming user equipment. The selecting can include evaluating respective cell level data of cells of the group of cells.

In accordance with some implementations, facilitating of the energy efficiency aware load balancing is based on a first reinforcement learning model, facilitating the controlling of the admission is based on a second reinforcement learning model, facilitating of the traffic steering is based on a third reinforcement learning model, and facilitating of the conflict mitigation is based on a fourth reinforcement learning model. Further to these implementations, the first reinforcement learning model, the second reinforcement learning model, the third reinforcement learning model, and the fourth reinforcement learning model are implemented as respective network automation tools.

In an example, the communication network is deployed as a disaggregated architecture that comprises central units, distributed units, and a near-real-time-radio access network intelligent controller. In another example, the group of cells is configured to operate according to a new radio network communication protocol.

Another embodiment relates to a system that includes a processor and a memory that stores executable instructions that, when executed by the processor, facilitate performance of operations. The operations can include performing conflict mitigation associated with a load balancing procedure, an admission control procedure, and a traffic steering procedure. A result of the conflict mitigation is activation of at least one of the load balancing procedure, the admission control procedure, or the traffic steering procedure. The method can also include performing one of the following. Based on a first activation of the load balancing procedure, distributing already served user equipment among a group of cells of a communication network. Based on a second activation of the admission control procedure, controlling admission of incoming user equipment to the communication network. Based on a third activation of the traffic steering procedure, controlling deactivation of cells of the group of cells.

In some implementations, distributing of the already served user equipment can include, based on a load balancing policy, determining that one or more user equipment of the already served user equipment are to be offloaded from a current serving cell to a single candidate cell. Further, based on a utility function, selecting the one or more user equipment of the already served user equipment. The method can also include causing the one or more user equipment to be handed off from the current serving cell to the single candidate cell.

According to some implementations, controlling of the admission of incoming user equipment can include, based on receipt of an admission request from the incoming user equipment and based on an admission control policy, selecting a cell from the group of cells for admission of the incoming user equipment. The selecting can include evaluating respective cell level data of cells of the group of cells.

In accordance with some implementations, controlling of the deactivation of cells of the group of cells can include, based on a cell deactivation policy, switching off a cell of the group of cells, wherein the cell comprises a network load that is determined to fail to satisfy a defined network load level. Further, based on the switching off of the cell, mitigating an overall power consumption of the group of cells.

In an example, the system is deployed in a disaggregated architecture of network equipment. In another example, the communication network is deployed as a disaggregated architecture that comprises central units, distributed units, and a near-real-time-radio access network intelligent controller.

Yet another embodiment relates to a non-transitory machine-readable medium, comprising executable instructions that, when executed by a processor of network equipment, facilitate performance of operations. The operations can include implementing energy efficiency aware load balancing of already served user equipment. The energy efficiency aware load balancing distributes the already served user equipment among a group of cells of a communication network. The operations can also include controlling of admission of incoming user equipment to the communication network and performing traffic steering of the incoming user equipment among the group of cells. Further, the operations can include performing conflict mitigation associated with the implementing of the energy efficiency aware load balancing, the controlling of the admission, and the performing of the traffic steering. Implementing of the energy efficiency aware load balancing, controlling of the admission, performing of the traffic steering, and performing of the conflict mitigation are performed in parallel and are based on a utility function. In an example, the communication network can be deployed as a disaggregated architecture that comprises central units, distributed units, and a near-real-time-radio access network intelligent controller.

In accordance with some implementations, implementing of the traffic steering comprises, based on a cell deactivation policy, switching off a cell determined to have a network load that is below a defined network load level. The switching off of the cell mitigates an overall power consumption of the group of cells.

In some implementations, implementing of the energy efficiency aware load balancing is based on a first reinforcement learning model, controlling of the admission is based on a second reinforcement learning model, performing of the traffic steering is based on a third reinforcement learning model, and performing of the conflict mitigation is based on a fourth reinforcement model. Further, the first reinforcement learning model, the second reinforcement learning model, the third reinforcement learning model, and the fourth reinforcement model are implemented as respective network automation tools.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which:

FIG. 2A illustrates a first equation (1) for an optimization problem in accordance with one or more embodiments described herein;

FIG. 2B illustrates a first term of the first equation (1) in accordance with one or more embodiments described herein;

FIG. 2C illustrates a second term of the first equation (1) in accordance with one or more embodiments described herein;

FIG. 2D illustrates a third term of the first equation (1) in accordance with one or more embodiments described herein;

FIG. 3 illustrates constraints that the first equation (1) is subject to in accordance with one or more embodiments described herein;

FIG. 7 illustrates a flow diagram of an example, non-limiting, computer-implemented method that facilitates policy coordination in accordance with one or more embodiments described herein;

FIG. 8 illustrates a second equation (2) for a long-term reward function in accordance with one or more embodiments described herein;

DETAILED DESCRIPTION

Figure 1:
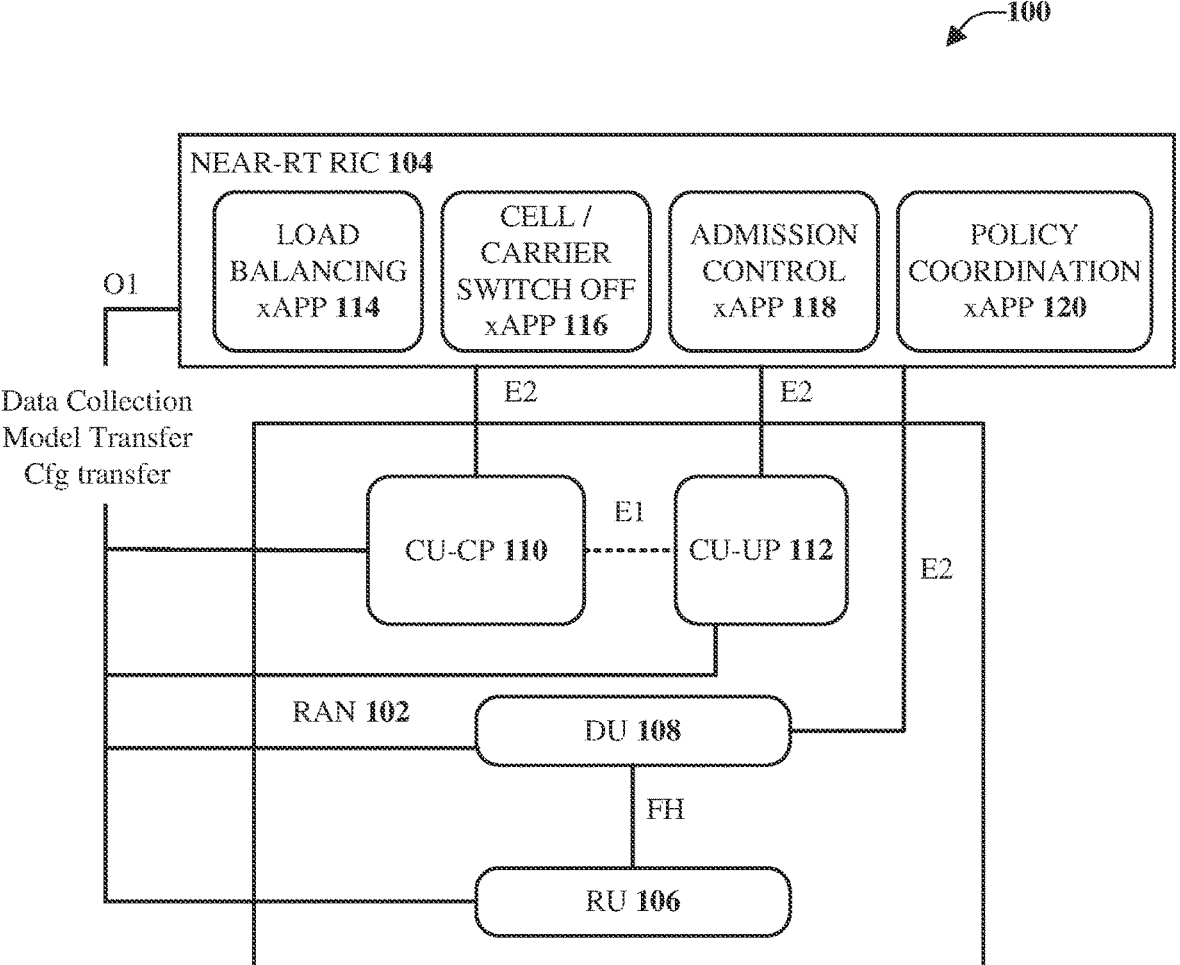
FIG. 1 illustrates an example, non-limiting, system architecture for multi-cell user equipment energy aware admission control, dynamic load balancing, and traffic steering in advanced communication networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

The high energy consumption of mobile networks (e.g., 5G networks and other advanced networks) is a source of concern for various reasons. For example, the high energy consumption can increase the operators' operational expenditure (OPEX). In another example, the high energy consumption can increase carbon emissions, which can be in direct conflict with, and can hamper, strategic climate goals and/or environmentally friendly policies adopted by governments and/or corporations around the globe. Conventional static energy saving techniques are not effective in mobile networks that have fluctuating traffic loads and User Equipment (UE) mobility patterns. Multiple energy saving (ES) features for mobile networks, such as deep sleep mode, carrier shut down, and radio frequency (RF) channels' switch off can be available in some form in conventional cellular networks (e.g., 5G networks and other advanced networks). However, due to the large parameter space involved in energy minimization processes in conventional networks, the ensuing optimization problem becomes non-polynomial-hard (NP-hard), which implies significant computation for obtaining an optimal (or the best possible) parameter set.

Recently, ES on shorter time scales have been proposed in academia as well as industry standards. These proposals include at symbol-level, subframe-level, and/or frame-level advanced sleep modes (ASM). The challenge for network operators, as well as standardization bodies, is to streamline network operational processes for energy efficiency (EE) specific use cases, such as activation and/or deactivation of sleep mode functionality and site energy management. While various techniques related to Artificial Intelligence (AI) and/or Machine Learning (ML) for EE have been proposed, implementation of such techniques without any perceivable impact on user Quality of Experience (QoE) is terra incognita (e.g., has been an unexplored field of knowledge as it relates to communication networks).

Another fundamental requirement for future networks is catering to a high number of UEs while meeting their diverse Quality of Service (QOS) requirements. This is typically handled through admission control (AC) policies of the network, which determines how many and what kind of UEs are served by the network on an average. The admission control policy can also potentially limit the number of served UEs within the network if the QoS of the UEs is deteriorated beyond a fixed threshold. Considering these two aspects of energy efficiency and admission control, it can be easily inferred that full cycle network optimization often has to contend with multiple requirements which may sometimes be in conflict with one other. Furthermore, wireless networks have multiple sites that are adjacent to each other and thus may influence each other's behavior to minimize network congestion, keep network throughput high and provide a seamless experience to the user.

To overcome the above as well as related issues, provided herein is a multi-cell framework which ensures energy efficient dynamic admission control, load balancing, and traffic steering between a cluster of cells concurrently while ensuring high QoS to the users. Also provided are various manners of achieving this using the recently proposed O-RAN framework. Also provided are control flow timing diagrams for multiple possible implementations of the proposed approach. Different AI and/or ML processes based on Reinforcement Learning (RL) can be used within the framework and the various embodiments to achieve a network operator's intent-based optimal tradeoff between number of UEs served by a cluster of cells and the cluster-wide EE while minimizing QoS violations.

In this regard for the avoidance of doubt, any embodiments described herein in the context of optimizing performance or an optimal tradeoff are not so limited and should be considered also to cover any techniques that implement underlying aspects or parts of the described aspects to improve or increase performance and/or a best possible tradeoff, even if resulting in a sub-optimal variant obtained by relaxing aspects or parts of a given implementation or embodiment.

Although 5G networks have been designed with some inherent enhanced efficiency as compared to previous generations of cellular networks, the aggregate power consumption for 5G (and other advanced) networks is higher than the power consumption for other networks, such as Long Term Evolution (LTE) networks. The higher power consumption in 5G networks (and other advanced networks) is due to the multitude magnitude increase in the traffic flowing through the network and the need for faster processing of complex tasks. Growing power consumption of the networks owing to denser deployments and higher processing demands at the Base Station (BS) is a challenge for network designers. Static energy saving techniques have been found to be relatively ineffective for mobile networks that experience varying traffic loads and user mobility patterns.

In addition, without any control on the number of UEs admitted to a cell, the QoS experienced at the UEs can deteriorate as the number of UEs served by a cell can saturate the capacity of the cell. However, since the magnitude and diversity of devices (e.g., UEs) is ever increasing, simply setting a fixed threshold to limit the maximum number of devices served by a cell is inefficient. There are some measures that have already been considered in network operation. One measure has been a process and criteria for setting the maximum number of UEs that can use a Network Slice (NS) simultaneously as part of NS admission control (AC). Another measure is that operators may set counters at the Radio Resource Control (RRC) level to control the maximum number of UEs in a cell. Recently some data-driven solutions based on a dynamic threshold have emerged. However, their decisions are applied per single cell and may lead to denial-of-service for rejected UEs and/or network load imbalances.

Yet another challenge in dense congested networks is how to distribute traffic in live networks proportionately between different cells and/or BSs to maintain user QoS by efficient resource allocation among group of cells and/or BSs.

Accordingly, the disclosed embodiments provide a solution to tackle the combined issues of maintaining high user QoS for varying traffic demand scenarios in a multi-cell network environment while minimizing the network power consumption and total number of admission rejections.

FIG. 1 illustrates an example, non-limiting, system architecture 100 for multi-cell user equipment energy aware admission control, dynamic load balancing, and traffic steering in advanced communication networks in accordance with one or more embodiments described herein.

It is noted that for purposes of explanation, an O-RAN framework will be discussed. However, the disclosed embodiments are not limited to an O-RAN framework implementation and, instead, other types of disaggregated architecture can be utilized with the various embodiments discussed herein. Further, as it relates to the O-RAN framework, the network equipment can include, but is not limited to, O-RAN Radio Units (O-RUs), O-RAN Control Units (O-CUs), O-RAN Distributed Units (O-DUs), and/or Random Access Network Intelligent Controllers (RICs). Further, the network automation tools include, but are not limited to, rApps and/or xApps.

A problem associated with conventional networks, and addressed herein, relates to there being no unified model to cater to multiple optimization objectives. Designing an optimization policy for a cluster of cells to optimize the tradeoff between multiple KPIs including determining a threshold for the number of UEs served within the cluster and minimizing an aggregate power consumption, metric for the cluster is a non-trivial exercise. In particular, besides dealing with the multiple dependencies, network designers now have to contend with the diversity of use cases enabled by 5G.

Another problem associated with conventional networks, and addressed herein, relates to the issue of conflicting policy recommendations to optimize a unified objectives optimization problem. This issue with conventional networks relates to conflict avoidance if admission control, load balancing, and energy efficiency focused applications yield potentially conflicting actions. Therefore, the question is that if different models are used for optimizing each KPI within the optimization framework, how can the models' recommendation be optimized to provide a single policy recommendation to be applied in the cluster.

Yet another problem associated with conventional networks, and addressed herein, relates to the lack of well-defined messaging flow and interfaces to handle complex optimization. Given the current impetus on open and disaggregated architectures, specifically by the O-RAN alliance in the mobile network space, it is also beneficial to determine how the information flow for such complex optimization tasks will be handled both from a control and data flow perspective. Determining the control flow between elements of the Open radio access network (O-RAN) reference architecture, including flow of statistics from O-RU to the RAN intelligent controllers (RICs), model training, model deployment and the cell and/or carrier switch off, user admission control and traffic steering configuration from the application at RICS (rApp and/or xApp) is therefore an inherent part of the design problem.

The disclosed embodiments provide a data driven multi-cell network which maximizes a long-term utility based on tradeoff between user QoS and network energy consumption. The disclosed framework performs dynamic load balancing between a cluster of cells as well as traffic steering for incoming UE traffic.

A main objective for the proposed embodiments is to optimize the network intent-based tradeoff between serving a maximum number of UEs requesting service, minimizing the cluster wide QoS violations defined for each class of UEs, and cluster-wide power consumption. For a cluster of O-RU cells managed by a common near-Real-Time (RT)-RIC, the optimization is performed for a longer time frame (few time slots) and for the entire cell space. FIG. 2A illustrates a first equation (1) for an optimization problem in accordance with one or more embodiments described herein. In the first equation (1), the number of RRC rejections is denoted for a given device class 'c' by $\rho c$ and the total number of RRC requests for that device class by $\sigma c$. Accordingly, the optimization problem can be numerically expressed as depicted in FIG. 2A.

FIG. 3 illustrates constraints that the first equation (1) is subject to in accordance with one or more embodiments described herein. The first term of the first equation (1), as depicted in FIG. 2B, is the RRC rejection rate for UE device class c during time slot t and represents the percentage of UEs not admitted in the network after receiving RRC requests during that time slot. The second term of the first equation (1) as depicted in FIG. 2C, represents the QoS violation ratio of UE device class c and is numerically represented by the ratio of number of UEs with QoS violations and the total number of UEs within the cluster during time slot t. The third term of the first equation (1), as depicted in FIG. 2D, is the power consumption factor, which is the ratio of power consumed by the cluster during the time slot t and the maximum power consumption of the cluster when carrying the highest traffic load without any power saving measure activated. C represents the set of device classes in the network.

QoS violations are defined for each user class separately. As an example, for UEs from the enhanced mobile broadband (eMBB) class, a QoS violation occurs if the signal-to-interference-and-noise ratio (SINR) of a served UE during a slot is less than the SINR required to support the minimum acceptable data rate. Similarly, for a UE from the ultra-reliable low latency communications (URLLC) class devices, a QoS violation occurs if the service delay of a UE is greater than the QoS determined service latency. $\alpha$, $\beta$, and $\gamma$ are the network intent-based tradeoff parameters between the RRC rejection rate, UE QoS violation rate, and the cluster power consumption.

In the case of the optimization problem elaborated in the first equation (1) of FIG. 2A, a lower value of the tradeoff parameter corresponds to a larger weightage within the optimization framework. Adaptation of these tradeoff parameters helps define the priority of the network operator which impacts the optimal policy required to define the objective function. $PRButil_{cell}$ denotes the PRB utilization of a cell from the group CELL which contains all the cells in the network. The constraint signifies that the PRB utilization of all cells at all time slots should not exceed the maximum PRB utilization limit given by $PRButil_{thresh}$, which can also ne operator defined.

Different classes of UE devices may have different priorities for network service. For example, a UE class may have a more urgent need for resources as compared to other classes. This is captured in the first equation (1) of FIG. 2A in the elaboration of the RRC rejection rate, where the factor $P_c$ represents the priority of UE device class c. In the formulation, rejecting a UE with a high priority class will have a larger impact on the optimization function value than rejecting a UE from a non-priority class. As an example, URLLC devices, which have a stringent service requirement, may have a higher priority factor as compared to mMTC class devices.

An embodiment provided herein relates to concurrent admission control, energy savings, load balancing, and traffic steering. Some implementations of network management planes have measures for load balancing, power control, and user admission control. However, these thresholds are static in nature and are fixed based on either analysis of historical network characteristics or internal (proprietary) design performed by network equipment vendors. However, both network design and behavior are evolving with the plethora of features enabled through newer 3GPP releases.

Therefore, embodiments that enable dynamic real-time adaptation to traffic variations, and QoS violations, as provided herein, are needed to help ensure an optimal usage of network resources. The solution proposed herein is a joint optimization framework which is solved through AI-based models using dynamic policies for joint power consumption, load balancing, traffic steering, and user admission control to ensure QoS per device class service assurance without overloading any cell within a cell cluster. The optimization framework introduced herein uses a combination of RRC rejection ratio, UE QoS rate, and cluster power consumption traded off using network-intent based parameters. This tradeoff is executed using distinct applications for dynamic load balancing, admission control, and energy efficiency enhancement of a cell cluster. Each application process provides policies and/or recommendations on actions to take within their domain to optimize a network intent-based utility function. A last application process on conflict mitigation makes the final decision on which policies to recommend based on the nature of and conflict status of the proposed policies.

Another embodiment provided herein relates to a data driven framework for joint optimization. The data-driven approach provided herein can be applied at the cluster level to improve network performance and efficiency. Since the formulation leads to a multi-objective optimization problem at the cell level, there is a complex relationship of the parameter set that is further compounded by the fact that the objectives may lead to a conflicting set of actions when addressed independently.

Further to the optimization objective captured in the first equation (1) of FIG. 2A, provided herein is a control flow architecture that uses multiple simultaneously functioning network modules for carrier and cell switch off, dynamic load balancing, traffic steering for incoming UEs in the cell cluster, and a policy coordination application that caters to scenarios when there are conflicting policy outputs from the simultaneously active modules. Although optimization is performed jointly within a cluster, defined herein is a mechanism whereby each xApp within the near-RT-RIC may yield a different optimal policy. This is because the applications are limited within their sets of action and are unaware of the impact other applications' actions may have on the utility function. A central coordinating application then decides on which policy to choose based on a different learning model trained from prior experiences.

Due to the dynamic nature of the environment, an RL based learning framework is used for each application that receives network telemetry data from O-RU and O-DU nodes. The RL model used for each application could vary based on the data characteristics and time granularity of training data, as well as the set of possible actions defined within the scope of the application. The load balancing xApp provides recommendations on load transfer between cells at pre-specified time intervals (or through network-event based trigger), the cell/carrier switch off application determines the feasibility of dynamically turning on/off cells/carriers based on the UE traffic patterns at pre-specified time intervals (or through network-event based trigger), and admission control application provides policy recommendations when a new UE admission request is received.

The RL agent within each application takes the current environment, UE performance KPIs, and network power consumption metrics as input, and proposes an action through a balance between exploration and exploitation of past actions. The policy coordination application which is also trained on an RL-based model makes the decision on the final policy proposal from the near-RT-RIC based on the network operator intent before forwarding to the relevant nodes in the network.

Yet another embodiment provided herein relates to deployment of the solution in a disaggregated architecture. As a benchmark deployment embodiment, the application of the proposed framework within an O-RAN reference architecture is provided herein. The disaggregated O-RAN architecture allows for multiple network control applications (xApps) to be simultaneously operational within the near-RT-RIC. The xApps can propose policy recommendations independently of the other xApps and the disaggregated O-RAN architecture also allows for multi-vendor xApp solution deployment. In addition, explained herein are the O-RAN specific control flow between E2 nodes (O-RU, O-DU, O-CU) and the near-RT-RIC for implementation of the approved policies and subsequent feedback loop between E2 nodes and near-RT-RIC for continuous AI and/or ML model update within the xApps.

With reference again to FIG. 1, the system architecture 100 includes a RAN 102 and a near-RT-RIC 104. As noted, although discussed with respect to O-RAN as the deployment architecture for purposes of describing the disclosed embodiments, similar mechanisms would be applicable within other versions of disaggregated network architectures.

In an O-RAN based disaggregated architecture, a network model of FIG. 1 assumes one or more RUs 106 connected to a unique DU 108 and CU, illustrated as a CU control plane (CU-CP 110) and a CU-user plane (CU-UP 112). The DUs 108 and CUs (e.g., the Cu-CP 110 and the CU-UP 112) are linked with a co-located near RT-RIC (e.g., the near-RT-RIC 104) Although not illustrated, a scheduler can be included in the DU 108.

A one-to-one relationship between the CU (e.g., the CU-CP 110 and the CU-UP 112) and the near-RT-RIC 104 is assumed so that the optimal policy for multiple cells can be derived by xApps within the single near-RT-RIC 104. In line with O-RAN reference architecture, the near-RT-RIC 104 hosts the xApps responsible for coordinated load balancing, admission control, energy efficiency and QoS control of multiple cells within its footprints. The model training can be performed offline or on a digital twin to avoid disruption in an operational network. The data collection at the near-RT-RIC 104 is conducted through the E2 and O1 interfaces. Once the models for a specific use case (load balancing, cell and/or carrier switch off/on, admission control, and so on) are trained, inference models for cell level coordination are deployed in the near-RT-RIC 104 as xApps. The objective of each xApp is optimization of the use-case specific metric subject to the constraint in the first equation (1). The policy coordination application makes the decision on the final policy proposal from the near-RT-RIC 104 based on the network operator intent before forwarding to the relevant E2 nodes (O-CU, O-DU, O-RU).

As illustrated, the Near-RT-RIC 104 includes a Load Balancing (LB) xApp 114, a Cell/Carrier Switch Off/On xApp 116, an Admission Control (AC) xApp 118, and a Policy Coordination xApp 120. The description of the different xApps is provided below.

Figure 4:
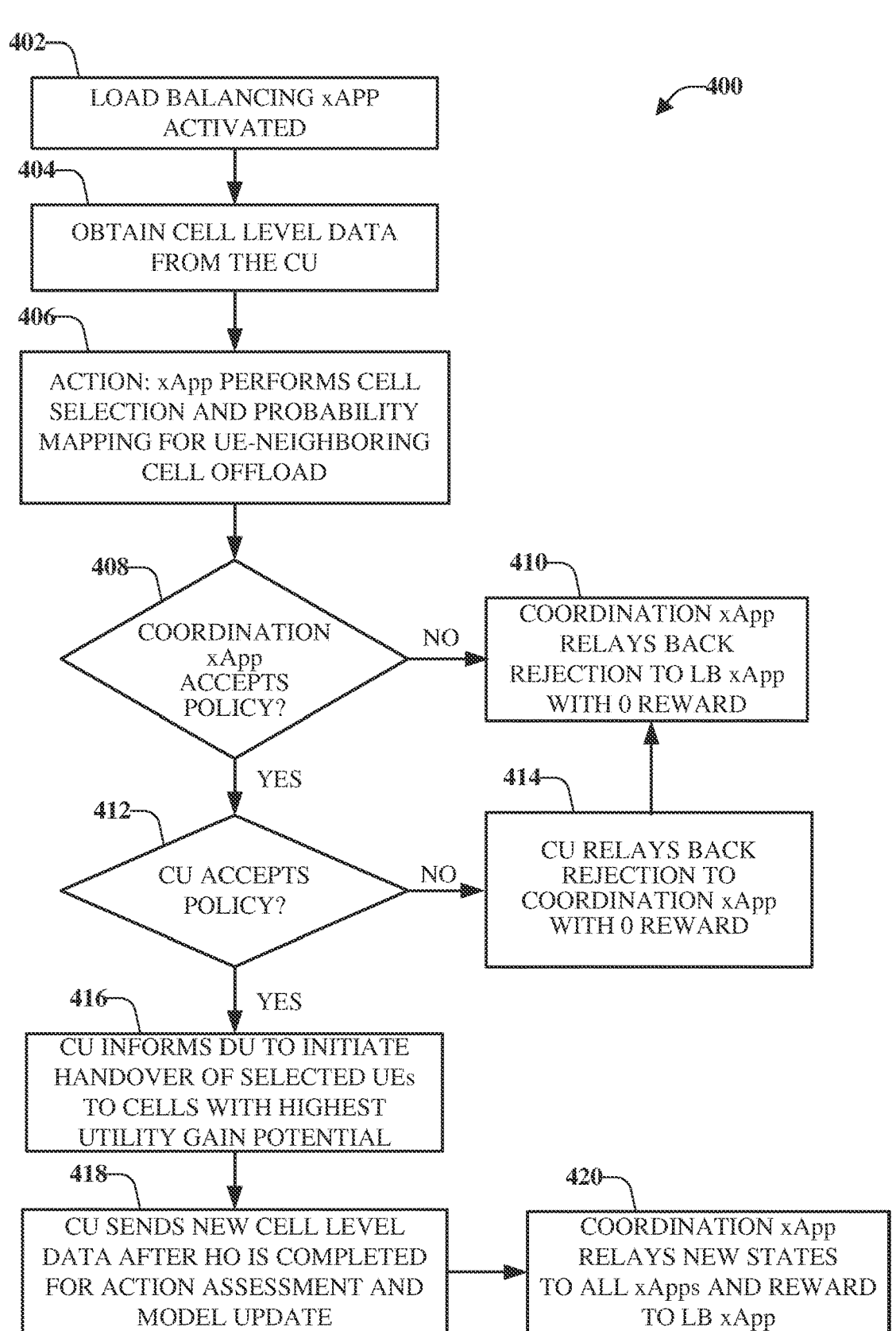
FIG. 4 illustrates a flow diagram of an example, non-limiting, computer-implemented method that facilitates load balancing for multi-cell user admission control in accordance with one or more embodiments described herein.

FIG. 4 illustrates a flow diagram of an example, non-limiting, computer-implemented method 400 that facilitates load balancing for multi-cell user admission control in accordance with one or more embodiments described herein. The computer-implemented method 400 and/or other methods discussed herein can be implemented by a system comprising a processor and a memory. In an example, the system can be implemented by a network equipment of a disaggregated network architecture. It is noted that the embodiment of FIG. 4 is discussed with respect to being deployed within an O-RAN framework, however, the disclosed embodiments are not limited to an O-RAN framework.

The load balancing of FIG. 4 can be facilitated via a Load Balancing xApp (e.g., the Load Balancing (LB) xApp 114) in accordance with one or more embodiments. At 402, the Load Balancing xApp is triggered (or activated). The application (e.g., the Load Balancing xApp) can be triggered after a set time interval and/or when one of the cells within the cluster reaches a utilization threshold.

Based on the average usage data from the cells within the purview of the near-RT-RIC control, the Load Balancing xApp decides on whether UEs from a certain cell need to be offloaded to other candidate cells. At any decision instance, the Load Balancing xApp will select, at most, a single cell for UE offloading, to avoid drastic change in network loads. The Load Balancing xApp will yield probability of improvement in the utility function for each combination of UE and its neighboring cells. This will allow the application to identify UEs that could potentially be offloaded along with the cells where they can be transferred without impacting their respective QoS. Dynamic load balancing policies are a function of cell loads, PRB utilization and the load states of neighbor cells.

Upon or after a UE is selected for re-association to achieve better load balancing, information indicative of the policy is communicated to the O-CU, which validates and transfers the instructions to a MAC scheduler for initiating the connection transfer from source to target cells. The UE transfer is managed through radio resource and mobility management layer, also known as Layer 3 (L3). Upon or after the UE migration is completed, the outcome (or reward) which is a function of the change in network utility as a result of the action is fed back to the xApp for refinement and improvement of future policy recommendations.

In further detail and with continuing reference to FIG. 4, at 404, cell level data is obtained from the CU. Action is taken, at 406, wherein the Load Balancing xApp performs cell selection and probability mapping for UE-neighboring cell offload. A decision is made, at 408, whether a coordination xApp accepts the policy. If the policy is not accepted ("NO"), at 410, the coordination xApp relays the rejection back to the Load Balancing xApp with a 0 reward (e.g., no reward).

Alternatively, if the decision at 408 is that the policy was accepted ("YES"), at 412, another determination is made whether the CU accepts the policy. If the CU does not accept the policy ("NO"), at 414, the CU relays the rejection back to the Coordination xApp with 0 reward (e.g., no reward). If the determination at 412, is that the CU accepts the policy ("YES"), at 416 the CU information is communicated to the DU to initiate handover of the selected UEs to cells determined to have the highest utility gain potential.

At 418, the CU sends new cell level data after the handover (HO) is completed for action assessment and model update. Further, at 420, the coordination xApp relays new states to all xApps and relays the reward to the Load Balancing xApp.

Figure 5:
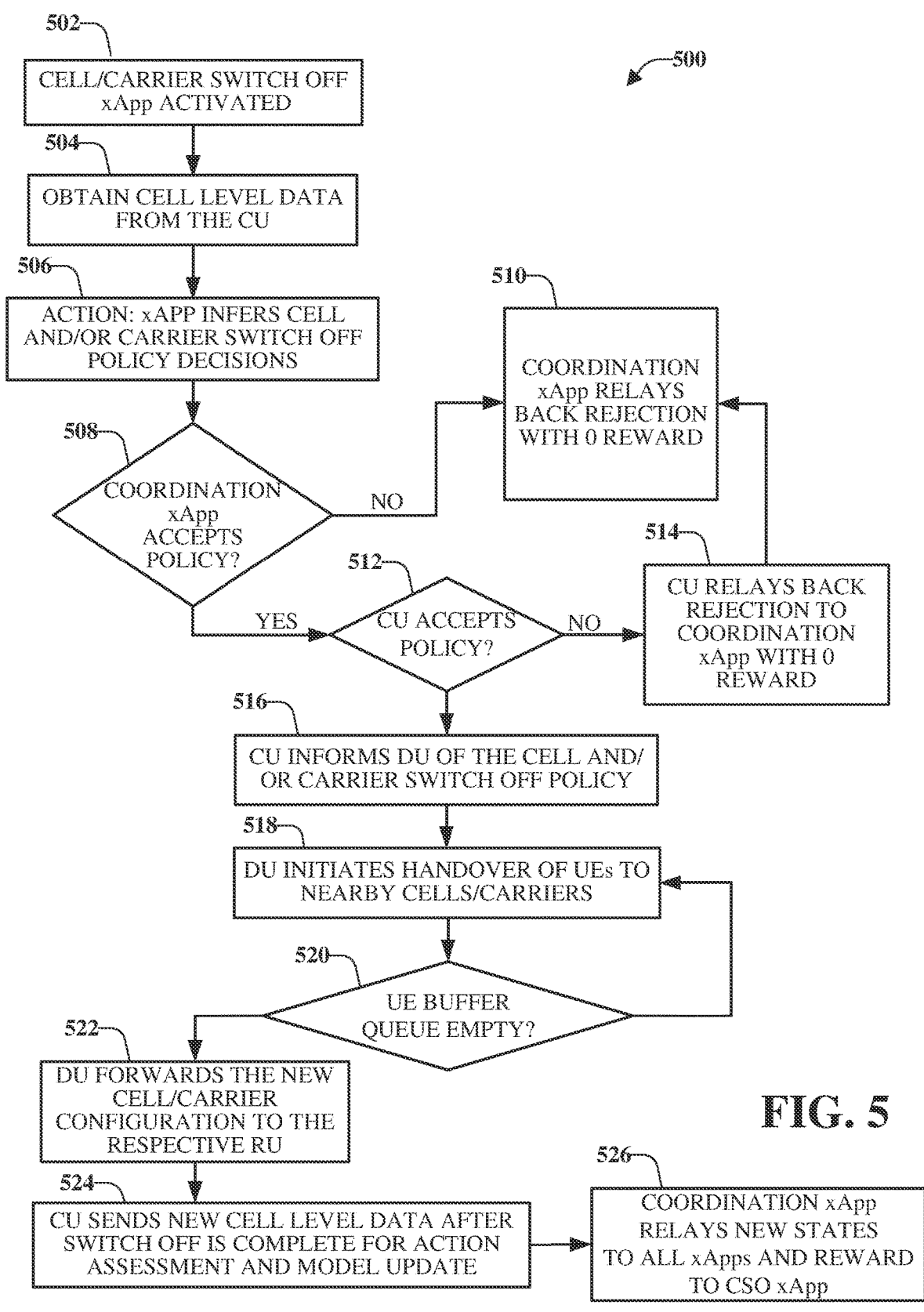
FIG. 5 illustrates a flow diagram of an example, non-limiting, computer-implemented method that facilitates cell and/or carrier switch off in accordance with one or more embodiments described herein.

FIG. 5 illustrates a flow diagram of an example, non-limiting, computer-implemented method 500 that facilitates cell and/or carrier switch off in accordance with one or more embodiments described herein. The computer-implemented method 500 and/or other methods discussed herein can be implemented by a system comprising a processor and a memory. In an example, the system can be implemented by a network equipment of a disaggregated network architecture. It is noted that the embodiment of FIG. 5 is discussed with respect to being deployed within an O-RAN framework, however, the disclosed embodiments are not limited to an O-RAN framework.

The load balancing of FIG. 5 can be facilitated via a cell and/or carrier switch xApp (e.g., the Cell/Carrier Switch Off/On xApp 116) in accordance with one or more embodiments. At 402, the Cell/Carrier Switch Off (CSO) xApp is triggered (or activated). The Cell/Carrier Switch Off (CSO) xApp facilitates improvement of the energy efficiency of the cell cluster by proposing policies that turn off carriers and/or cells which are lightly loaded (e.g., below a defined threshold or that fail to satisfy the threshold) reducing the overall power consumption of the cell cluster. The Cell/Carrier Switch Off (CSO) xApp utilizes characteristics of the cell cluster and selects, at most, a single cell and/or carrier for switch off in each decision instance. The characteristics of the cell cluster include, but are not limited to, current power consumption levels, cell loads, UE distributions, QoS values, and/or neighbor cell loads. The policy is forwarded to the O-CU which decides on whether to accept the policy, or otherwise.

Upon or after the CU decision to accept the policy or not has been made, the O-CU relays this decision to MAC/ Scheduler in the O-DU, which implements handover configuration functions to clear out the UE buffers from the cell and/or carrier to be switched off. Upon completion of handover, the O-DU instructs the O-RU to switch off the cell or carrier. A similar process is followed for switching on the cell and/or carrier. Accordingly, although various embodiments are discussed with switching off the cell and/or carrier, such embodiments can also be applied to switching on the cell and/or carrier.

The O-CU decision is also communicated back to the xApp for future recommendation improvements. The communication can be made to the xApp simultaneously, at about a same time, or shortly after the decision is made. If a recommendation from xApp is not accepted by the O-CU, the xApp might not suggest similar policies in the future based on a reward shaping approach adopted by the policy coordination RL based xApp.

In further detail and with continuing reference to FIG. 5, at 502, the Cell/Carrier Switch Off (CSO) xApp is activated. At 504, the Cell/Carrier Switch Off (CSO) xApp obtains cell level data from the CU. Action is taken, at 506, wherein the Cell/Carrier Switch Off (CSO) xApp infers cell and/or carrier switch off policy decisions. A determination is made, at 508, whether the coordination xApp accepts the policy. If the policy is not accepted by the coordination xApp ("NO"), at 510 the coordination xApp relays back a rejection with a 0 reward (e.g., no reward).

Alternatively, if it is determined at 508 that the coordination xApp accepts the policy ("YES"), at 512, another determination is made whether the CU accepts the policy. If the CU does not accept the policy ("NO"), at 514, the CU relays back the rejection to the coordination xApp with a 0 reward (e.g., no reward). Alternatively, if the CU does accept the policy ("YES"), at 516 the CU communicates to the DU information indicative of the cell and/or carrier switch off policy. Thereafter, at 518, the DU initiates handover of UEs to nearly cells and/or carriers.

A determination is made, at 520, whether the UE buffer queue is empty. If the buffer queue is not empty ("NO"), the computer-implemented method 500 returns to 518. Alternatively, if it is determined at 520 that the UE buffer queue is empty ("YES"), at 522 the DU forwards the new cell and/or carrier configuration to the respective RU. The CU sends new cell level data, at 524, after switch off is complete for action assessment and model updates. Further, at 526, the coordination xApp relays new states to all xApps and a reward to a CSO xApp.

Figure 6:
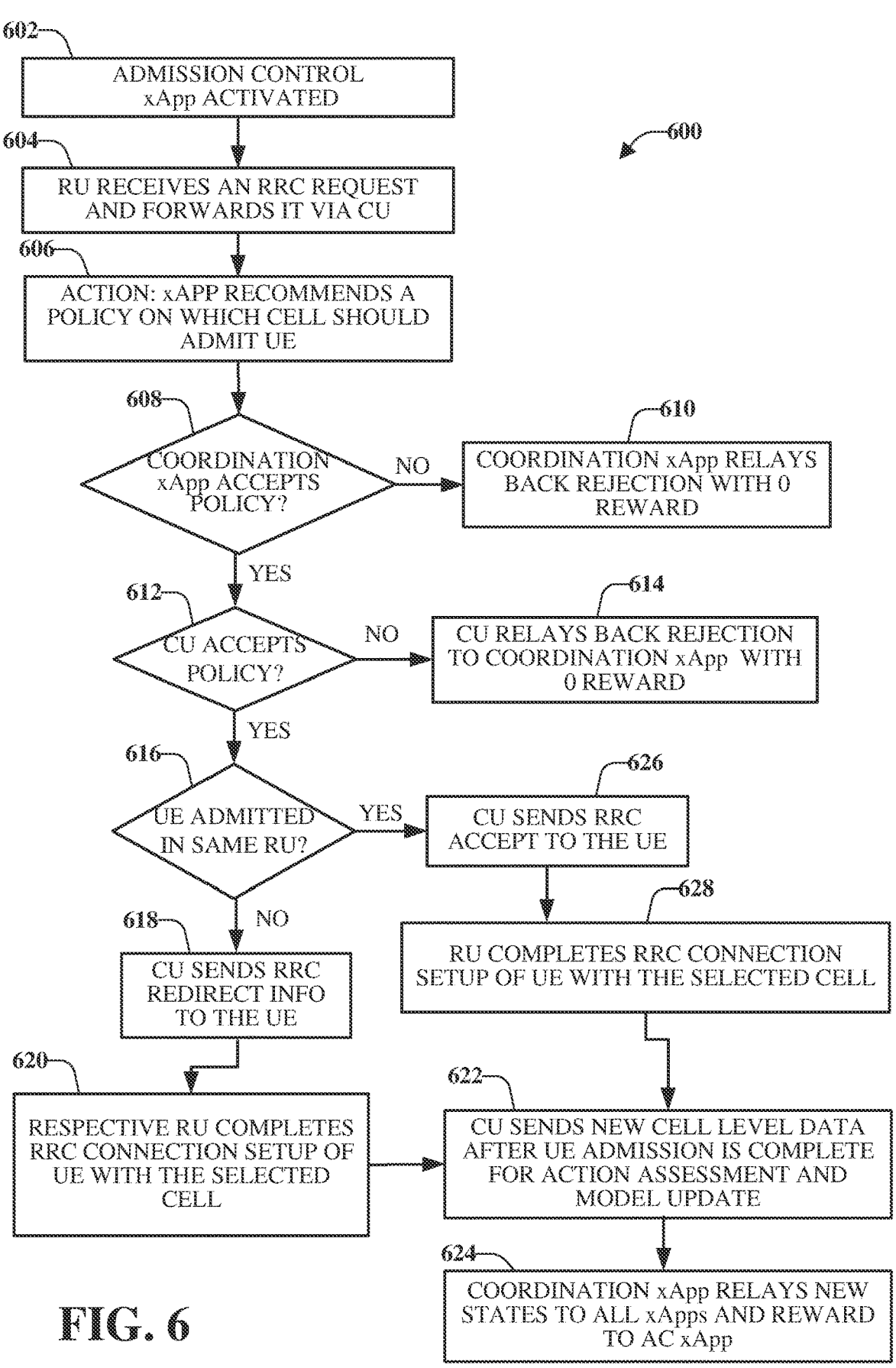
FIG. 6 illustrates a flow diagram of an example, non-limiting, computer-implemented method that facilitates admission control in accordance with one or more embodiments described herein.

FIG. 6 illustrates a flow diagram of an example, non-limiting, computer-implemented method 600 that facilitates admission control in accordance with one or more embodiments described herein. The computer-implemented method 600 and/or other methods discussed herein can be implemented by a system comprising a processor and a memory. In an example, the system can be implemented by a network equipment of a disaggregated network architecture. It is noted that the embodiment of FIG. 6 is discussed with respect to being deployed within an O-RAN framework, however, the disclosed embodiments are not limited to an O-RAN framework.

The admission control of FIG. 6 can be facilitated via an admission control xApp (e.g., the Admission Control (AC) xApp 118). The Admission Control (AC) xApp operates as a gate keeper to the number of UEs within the cluster, and is triggered when an O-RU receives an RRC request. Instead of the RRC directly taking the decision regarding admission of a UE to the cell, the Admission Control (AC) xApp uses cell level data on cell load, power consumption, UE device class distribution, QoS values per device class, neighbor cell load, and so on, to decide the most appropriate cell where the UE should be connected to, in the situation where it is admitted in the network. In case the policy recommends admitting the UE in a cell of the same O-RU which received the RRC request, the O-CU sends the RRC accept back to the UE after which the RRC Connection Setup takes place. In case the Admission Control (AC) xApp suggests admitting the UE to a different cell, a RRCRedirectInfo message is sent to the UE once the policy if approved by the O-CU. The UE completes the RRC connection setup process with the new cell as recommended by the Admission Control (AC) xApp. In case the Admission Control (AC) xApp 118 determines that admitting the UE to any of the available cells will lower the overall utility, it sends an RRC reject recommendation to the O-CU.

In further detail and with continuing reference to FIG. 6, at 604, the RU receives an RRC request and forwards the RRC request via the CU. Action is taken, at 606, wherein the xApp recommends a policy on which cell should admit the UE. A determination is made, at 608, whether the coordination xApp accepts the policy. If it is determined that the policy was not accepted by the coordination xApp ("NO"), at 610, the coordination xApp relays back the rejection with a 0 reward (e.g., no reward).

Alternatively, if it is determined that the coordination xApp accepts the policy ("YES"), at 612, another determination is made whether the CU accepts the policy. If the CU does not accept the policy ("NO"), at 614 the CU relays back the rejection to the coordination xApp with a 0 reward (e.g., no reward).

If it is determined at 612 that the CU accepts the policy ("YES"), at 616, another determination is made whether the UE is admitted in the same RU. If the UE is not admitted in the same RU ("NO"), at 618 the CU sends RRC redirect information to the UE. Further, at 620, the respective RU completes RRC connection setup of the UE with the selected cell. At 622, the CU sends new cell level data after UE admission is completed for action assessment and model update. The coordination xApp relays new states to all xApps and a reward to the Admission Control xApp at 624.

Alternatively, if it is determined at 612 that the UE is admitted in the same RU ("YES"), at 626 the CU sends an RRC accept to the UE. Further, at 628 the RU completes RRC connection setup of the UE with the selected cell. The computer-implemented method 600 continues at 622 and the CU sends new cell level data after UE admission is completed for action assessment and model update. Further, at 624, the coordination xApp relays new states to all xApps and a reward to the Admission Control xApp.

FIG. 7 illustrates a flow diagram of an example, non-limiting, computer-implemented method 700 that facilitates policy coordination in accordance with one or more embodiments described herein. The computer-implemented method 700 and/or other methods discussed herein can be implemented by a system comprising a processor and a memory. In an example, the system can be implemented by a network equipment of a disaggregated network architecture. It is noted that the embodiment of FIG. 7 is discussed with respect to being deployed within an O-RAN framework, however, the disclosed embodiments are not limited to an O-RAN framework.

The admission control of FIG. 7 can be facilitated via a policy coordination xApp (e.g., the Policy coordination xApp 120). The Policy Coordination xApp receives policy decisions from the other xApps (e.g., load balancing, cell and/or carrier switch off, and admission control xApps) and checks for conflicting policies. A predefined set of rules and priorities may be provided to Policy Coordination xApp (by the operator or network designer) to determine xApp priority in case two or more applications propose policies that contradict each other. As an example, the load balancing xApp may recommend UEs of a cell be transferred to cell "X" as the nearest neighbor cell, but the carrier and/or cell switch off xApp might be recommending switching off the same cell "X" taking it out of consideration. Since accepting both policies would leave the UEs that are transferred with compromised service and QoS (and potentially being dropped), the Policy Coordination xApp 120 in this case would accept one of these policies based on its own RL-based learning model. The RL-based model is trained on situations of conflicting policies using the environment states and yields percentage of utility increase (or expected gain in utility), based on which the decision on which policy to recommend from near-RT-RIC is finalized. The final policies from near-RT-RIC for cell cluster performance optimization are selected by the Policy Coordination xApp 120 and forwarded to the O-CU. The overall utility reward after selection of a policy is given to the Policy Coordination xApp 120 model along with the model that proposed the selected policy.

In further detail and with continuing reference to FIG. 7, at 702 the policy coordination xApp is activated. Other xApps send their policies to the policy coordination xApp, at 704. Action is taken, at 706, wherein the policy coordination xApp checks for conflicting actions between the other xApps. A determination is made, at 708, whether a conflict exists.

If no conflict exists ("NO"), at 710, the policy coordination xApp relays all of the policies to the CU. Another determination is made, at 712, whether the CU accepts the policy. If the policy is not accepted by the CU ("NO"), at 714, the CU relays back a rejection to the coordination xApp with a 0 reward (e.g., no reward).

Alternatively, if the determination at 708 is that there is a conflict ("YES"), at 716 action is taken, wherein the policy coordination xApp decides on the policy which will have the highest impact on the cell cluster optimization. The policy coordination xApp relays the selected policy and/or polices to the CU, at 718. At 712, a determination is made whether the CU accepts the policy. If the policy is not accepted, the computer-implemented method 700 continues, at 714, and the CU relays back a rejection to the coordination xApp with a 0 reward (e.g., no reward).

If the policy is accepted at 712 ("YES"), at 720 the CU sends new cell level data after running selected policies for action assessment and model update. Further, at 722, the coordination xApp relays new states to all xApps and retains the reward for itself.

Another embodiment discussed herein is related to an RL based process. The novelty within this embodiment lies in how the elements of the state space are used to define the actions pertaining to applications, and the reward function which is shaped exponentially to ensure faster convergence. The process can be any RL based process, such as the deep Q network (DQN), or any other variant, such as DDPG. The information required for the applications may include state space. Some of the information which can be included in the training models include but are not limited to: UE/BS locations, BS Adjacency Matrix, cell load statistics, per Slice QoS thresholds, UE KPI metrics (throughput, latency), HO statistics, received signal power measures (RSRP/RSRQ), Channel Quality Indicator (CQI) measurements, and so on.

For the LB xApp, the action space can be related to selection of the Cell where offloading of UEs is required along with the probability distribution showing improvement in utility for each UE-neighboring cell pair within the selected cell. For the AC xApp, the action space can include to Accept or REJECT an incoming RRC request. In the case of ACCEPT, a determination is made related to which cell will yield maximum utility value. For the CSO xApp, the action space can be related to selection of the Cell and/or Carrier to be switched off along with probability that turning off the cell/carrier will improve utility value. Further, for the Policy Coordination xApp, the action space can be, in case of policy conflicts, select the policy which is expected to yield maximum utility gain.

Figure 8:
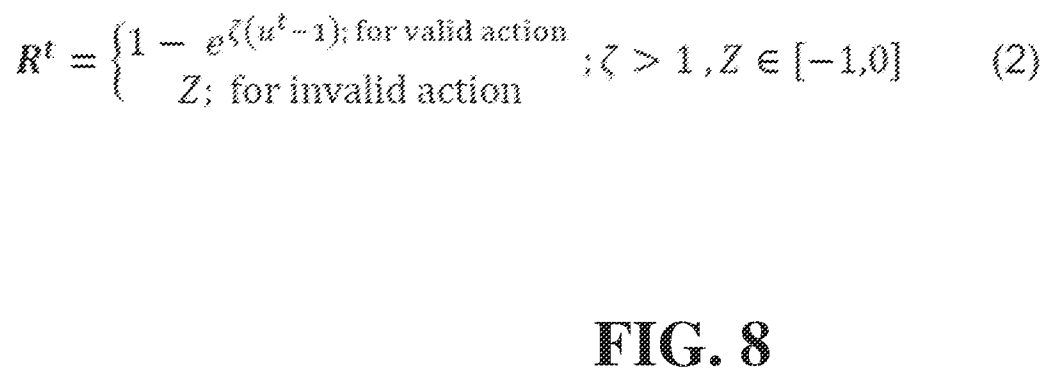

FIG. 8 illustrates a second equation (2) for a long-term reward function in accordance with one or more embodiments described herein. A uniform reward function for the applications reflects the objective function utility supplemented with a reward shaping function for faster convergence of the process. To facilitate faster convergence, an exponential function-based reward shaping is applied which yields higher rewards for actions that give close to the optimal utility values. This amplifies the difference between values of the utility function. The discerning of difference between applications' actions allows acceleration of the stochastic gradient descent (SGD) process within the RL process.

For the second equation (2), ut is the optimization function argument given in the first equation (1). An invalid action in this use case may be the case when the applications suggest moving a UE to a cell that is fully loaded or does not provide coverage to the UE in its current location.

Accordingly, provided herein are various embodiments related to improvement of energy efficiency of a network while also maintaining high user quality of experience, and efficient balancing of traffic load among the base stations within the network.

It should be noted that terms such as "real-time," "near real-time," "dynamically," "instantaneous," "continuously," and the like can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 second) control of RAN elements and their resources through applications, e.g., specialized applications called rApps. Example, non-limiting Near-Real Time RAN Intelligent Controller (Near-RT RIC) functions enable near-real-time optimization and control and data monitoring of O-CU and O-DU nodes in near-RT timescales (e.g., a second range of time representing less time than the first time range, such as between 10 milliseconds and 1 second). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RAN Intelligent Controller (RT RIC) is designed to handle network functions at real time timescales (e.g., a third range of time representing less time than the first time range and the second time range, such as <10 milliseconds).

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Aspects of systems, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As used herein, the term "storage device," "first storage device," "second storage device," "storage cluster nodes,"

"storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
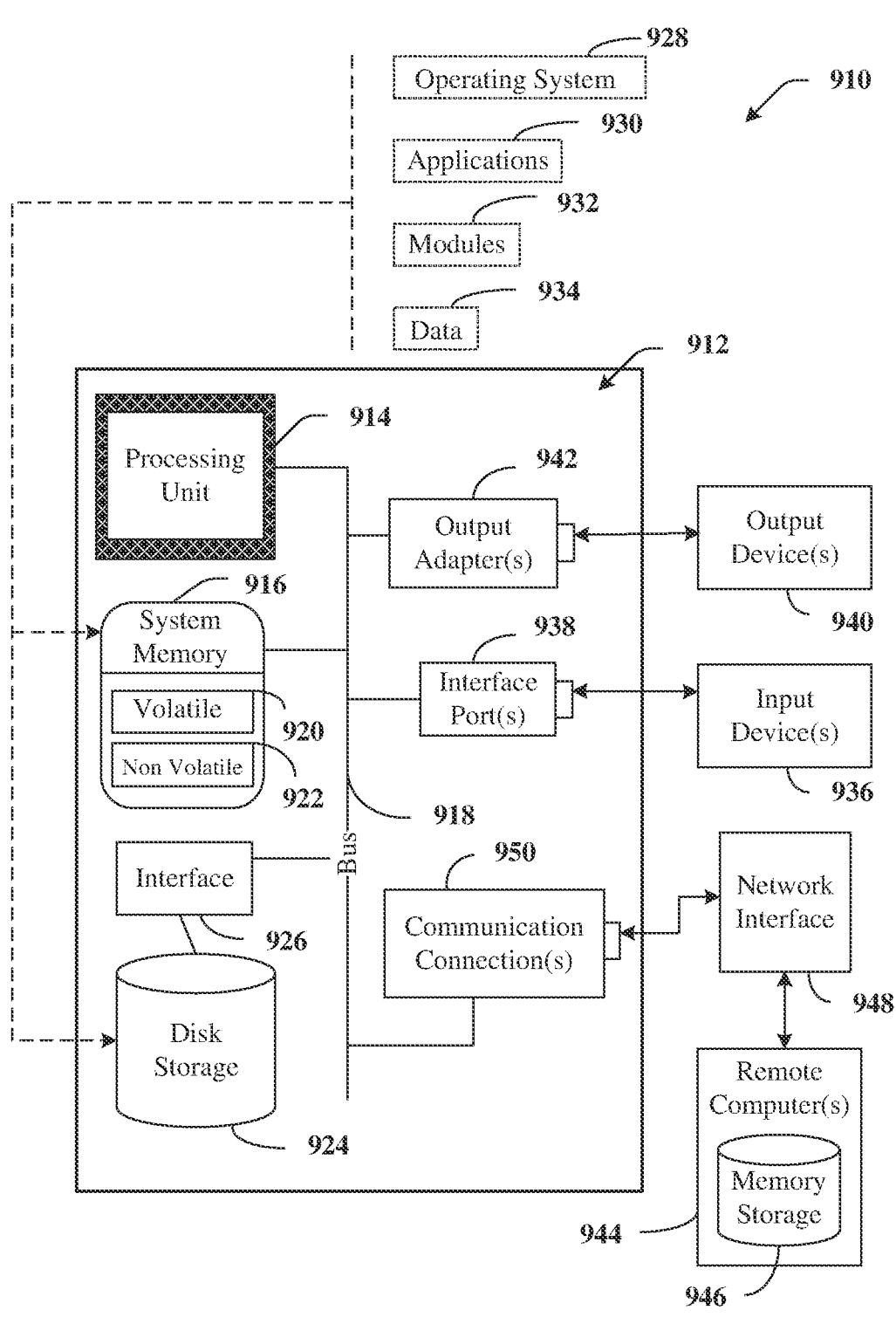
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
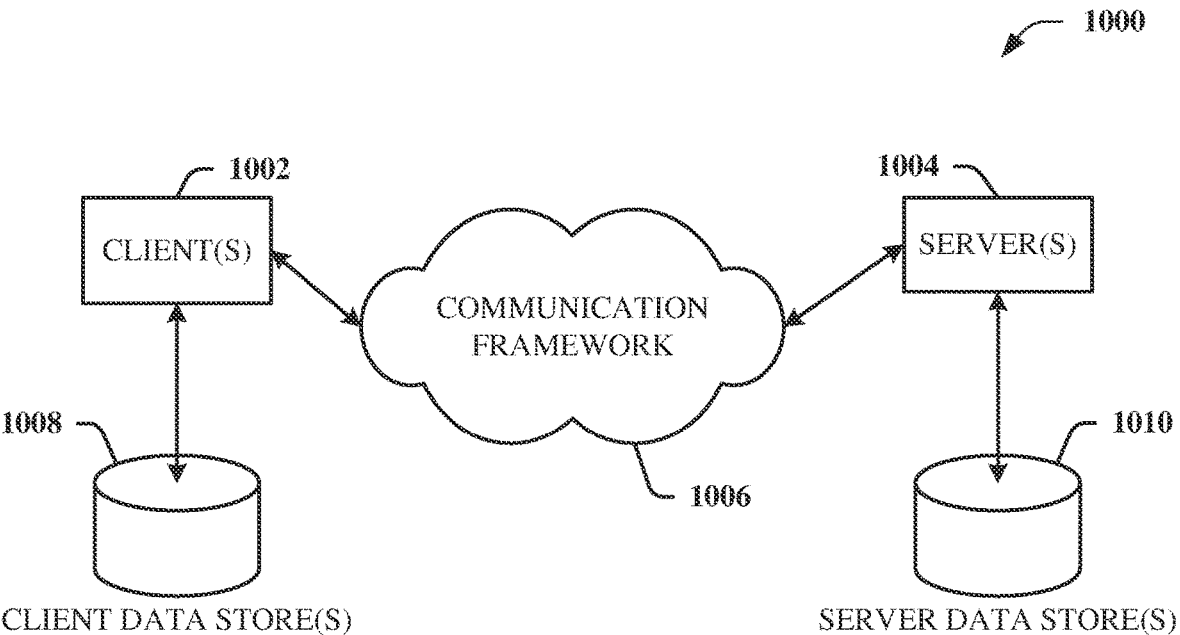
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a system comprising at least one processor, energy efficiency aware load balancing of already served user equipment, wherein the energy efficiency aware load balancing distributes the already served user equipment among a group of cells of a communication network;

facilitating, by the system, controlling of admission of incoming user equipment to the communication network; and facilitating, by the system, traffic steering of the incoming user equipment among the group of cells; and facilitating, by the system, conflict mitigation among respective policies associated with the facilitating the energy efficiency aware load balancing, the facilitating of the controlling of the admission, and the facilitating of the traffic steering, wherein, based on a determination that a conflict exists among the respective policies, the conflict mitigation selects a policy from the respective polices for implementation, and wherein the facilitating of the energy efficiency aware load balancing, the facilitating of the controlling of the admission, the facilitating of the traffic steering, and the facilitating of the conflict mitigation are performed concurrently and are based on a utility function.

2. The method of claim 1, wherein the facilitating of the energy efficiency aware load balancing is based on a load balancing policy determined by a load balancing model, the method further comprising:

based on receipt of a first acceptance of the load balancing policy from a coordination application and a second acceptance of the load balancing policy from a control unit:

initiating, by the system, a handover of selected user equipment of the already served user equipment to cells of the group of cells determined to have a higher utility gain potential as compared to other cells of the group of cells;

after completion of the handover, sending, by the system, updated cell level data to the load balancing model, wherein the load balancing model is retrained on the updated cell level data; and applying, by the system, a reward to the load balancing model based on a reward function.

3. The method of claim 1, wherein the facilitating of the controlling of the admission is based on an admission control policy determined by an admission control model, and the method further comprising:

based on receipt of a first acceptance of the admission control policy from a coordination application and a second acceptance of the admission control policy from a control unit, and based on the incoming user equipment being admitted to a defined radio unit:

sending, by the system, an admission approval message to the incoming user equipment;

after completion of establishment of the incoming user equipment within a selected cell, sending, by the system, updated cell level data to the admission control model, wherein the admission control model is retrained on the updated cell level data; and applying, by the system, a reward to the admission control model based on a reward function.

4. The method of claim 1, wherein the facilitating of the energy efficiency aware load balancing is based on a first policy, the facilitating the controlling of the admission is based on a second policy, and the facilitating the traffic steering is based on a third policy, and wherein the facilitating of the conflict mitigation comprises:

determining a conflict exists between the first policy and the second policy;

based on the utility function, determining that the first policy comprises a first utility gain and the second policy comprises a second utility gain, wherein the second utility gain is more than the first utility gain; and implementing the second policy, wherein the first policy is not implemented.

5. The method of claim 1, wherein the facilitating of the traffic steering comprises, based on a cell deactivation policy, switching off a cell determined to have a network load that is below a defined network load level, and wherein the switching off of the cell mitigates an overall power consumption of the group of cells.

6. The method of claim 1, wherein the facilitating of the energy efficiency aware load balancing comprises:

based on a load balancing policy, determining that one or more user equipment of the already served user equipment are to be offloaded from a current serving cell to a single candidate cell;

based on the utility function, selecting the one or more user equipment of the already served user equipment; and causing the one or more user equipment to be handed off from the current serving cell to the single candidate cell.

7. The method of claim 1, wherein the facilitating of the controlling of the admission comprises:

based on receipt of an admission request from an incoming user equipment and based on an admission control policy, selecting a cell from the group of cells for admission of the incoming user equipment, wherein the selecting comprises evaluating respective cell level data of cells of the group of cells.

8. The method of claim 1, wherein the facilitating of the energy efficiency aware load balancing is based on a first reinforcement learning model, the facilitating the controlling of the admission is based on a second reinforcement learning model, the facilitating of the traffic steering is based on a third reinforcement learning model, and the facilitating of the conflict mitigation is based on a fourth reinforcement learning model, and wherein the first reinforcement learning model, the second reinforcement learning model, the third reinforcement learning model, and the fourth reinforcement learning model are implemented as respective network automation tools.

9. The method of claim 1, wherein the communication network is deployed as a disaggregated architecture that comprises central units, distributed units, and a near-real-time-radio access network intelligent controller.

10. The method of claim 1, wherein the group of cells is configured to operate according to a new radio network communication protocol.

11. A system, comprising:

a processor; and a memory that stores executable instructions that, when executed by the processor, facilitate performance of operations, comprising:

performing conflict mitigation associated with a load balancing procedure, an admission control procedure, and a traffic steering procedure, wherein a result of the conflict mitigation is activation of at least one of the load balancing procedure, the admission control procedure, or the traffic steering procedure; and performing at least one of:

based on a first activation of the load balancing procedure, distributing already served user equipment among a group of cells of a communication network;

based on a second activation of the admission control procedure, controlling admission of incoming user equipment to the communication network; and based on a third activation of the traffic steering procedure, controlling deactivation of cells of the group of cells.

12. The system of claim 11, wherein the distributing of the already served user equipment comprises:

based on a load balancing policy, determining that one or more user equipment of the already served user equipment are to be offloaded from a current serving cell to a single candidate cell;

based on a utility function, selecting the one or more user equipment of the already served user equipment; and causing the one or more user equipment to be handed off from the current serving cell to the single candidate cell.

13. The system of claim 11, wherein the controlling of the admission of incoming user equipment comprises:

based on receipt of an admission request from the incoming user equipment and based on an admission control policy, selecting a cell from the group of cells for admission of the incoming user equipment, wherein the selecting comprises evaluating respective cell level data of cells of the group of cells.

14. The system of claim 11, wherein the controlling of the deactivation of cells of the group of cells comprises:

based on a cell deactivation policy, switching off a cell of the group of cells, wherein the cell comprises a network load that is determined to fail to satisfy a defined network load level; and based on the switching off of the cell, mitigating an overall power consumption of the group of cells.

15. The system of claim 11, wherein the system is deployed in a disaggregated architecture of network equipment.

16. The system of claim 11, wherein the communication network is deployed as a disaggregated architecture that comprises central units, distributed units, and a near-real-time-radio access network intelligent controller.

17. A non-transitory machine-readable medium, comprising executable instructions that, when executed by a processor of network equipment, facilitate performance of operations, comprising:

implementing energy efficiency aware load balancing of already served user equipment, wherein the energy efficiency aware load balancing distributes the already served user equipment among a group of cells of a communication network;

controlling of admission of incoming user equipment to the communication network;

performing traffic steering of the incoming user equipment among the group of cells; and performing conflict mitigation associated with the implementing of the energy efficiency aware load balancing, the controlling of the admission, and the performing of the traffic steering, wherein the implementing of the energy efficiency aware load balancing, the controlling of the admission, the performing of the traffic steering, and the performing of the conflict mitigation are performed in parallel and are based on a utility function.

18. The non-transitory machine-readable medium of claim 17, wherein the implementing of the traffic steering comprises, based on a cell deactivation policy, switching off a cell determined to have a network load that is below a defined network load level, and wherein the switching off of the cell mitigates an overall power consumption of the group of cells.

19. The non-transitory machine-readable medium of claim 17, wherein the implementing of the energy efficiency aware load balancing is based on a first reinforcement learning model, the controlling of the admission is based on a second reinforcement learning model, the performing of the traffic steering is based on a third reinforcement learning model, and the and the performing of the conflict mitigation is based on a fourth reinforcement learning model, and wherein the first reinforcement learning model, the second reinforcement learning model, the third reinforcement learning model, and the fourth reinforcement learning model are implemented as respective network automation tools.

20. The non-transitory machine-readable medium of claim 17, wherein the communication network is deployed as a disaggregated architecture that comprises central units, distributed units, and a near-real-time-radio access network intelligent controller.

* * * * *